United States Patent [19]

Fujisaki et al.

[11] Patent Number: 4,942,780
[45] Date of Patent: Jul. 24, 1990

[54] HST(HYDROSTATIC TRANSMISSION) HOUSING AXLE DRIVING APPARATUS

[75] Inventors: Koichiro Fujisaki; Ryota Ohashi, both of Kobe; Shusuke Nemoto, Yao, all of Japan

[73] Assignee: KANZAKI KOKYUKOKI MFG., CO. LTD., Japan

[21] Appl. No.: 397,960

[22] Filed: Aug. 23, 1989

Related U.S. Application Data

[63] Continuation of Ser. No. 212,017, Jun. 27, 1988.

[30] Foreign Application Priority Data

Jun. 26, 1987 [JP] Japan ................. 62-160653
Jun. 27, 1987 [JP] Japan ................. 62-160689

[51] Int. Cl.$^5$ ............................................. F16H 47/04
[52] U.S. Cl. .................................. 475/83; 74/606 R
[58] Field of Search ............... 74/687, 718, 606 R, 74/681, 701, 710; 60/487

[56] References Cited

U.S. PATENT DOCUMENTS

| | | | |
|---|---|---|---|
| 2,808,738 | 10/1957 | Bartell | 74/701 |
| 3,131,580 | 5/1964 | Forster | 74/720 |
| 3,196,696 | 7/1965 | Ritter | 74/15.63 |
| 3,318,092 | 5/1967 | Boydell | 60/487 |
| 3,327,556 | 6/1967 | Blavette | 74/701 |
| 3,805,641 | 4/1974 | Hause | 74/687 X |
| 4,502,352 | 3/1985 | Svab | 74/701 X |
| 4,627,237 | 12/1986 | Hutson | 60/487 |
| 4,784,013 | 11/1988 | Yamaoka et al. | 74/606 R |
| 4,854,125 | 8/1989 | Inoue | 60/487 X |

FOREIGN PATENT DOCUMENTS

| | | | |
|---|---|---|---|
| 1159280 | 12/1963 | Fed. Rep. of Germany | 74/687 |
| 1945441 | 3/1971 | Fed. Rep. of Germany | 74/701 |
| 2707911 | 8/1978 | Fed. Rep. of Germany | 74/701 |
| 3239223 | 6/1984 | Fed. Rep. of Germany | 74/687 |
| 480955 | 5/1953 | Italy | 60/487 |
| 58-20924 | 2/1983 | Japan . | |
| 60-1028 | 1/1985 | Japan . | |
| 61-27366 | 2/1986 | Japan | 74/687 |
| 61-261127 | 11/1986 | Japan . | |
| 62-85759 | 4/1987 | Japan . | |
| 62-87253 | 6/1987 | Japan . | |
| 198186 | 8/1965 | Sweden | 74/687 |
| 291296 | 9/1953 | Switzerland | 60/487 |
| 924185 | 4/1963 | United Kingdom . | |
| 2032586 | 9/1980 | United Kingdom . | |

*Primary Examiner*—Dwight Diehl
*Assistant Examiner*—Chris Campbell
*Attorney, Agent, or Firm*—Saidman, Sterne Kessler & Goldstein

[57] ABSTRACT

An HST housing axle driving apparatus for a small-sized running vehicle, such as a tractor, in which an axle casing is divided into a left-side half axle casing and a right-side half axle casing. In one of the left- and right-side half axle casings are disposed a hydraulic pump provided with a vertical pump shaft and a hydraulic motor provided with a horizontal motor shaft. In the other of the left- and right-side half axle casings are disposed a speed reduction shaft and a differential gear unit, so that a driving force is adapted to be transmitted from the vertical pump shaft to said horizontal motor shaft.

2 Claims, 5 Drawing Sheets

HST(HYDROSTATIC TRANSMISSION) HOUSING AXLE DRIVING APPARATUS

This application is a continuation of application Ser. No. 07/212,017, filed Jun. 27, 1988.

FIELD OF THE INVENTION

The present invention relates to an axle driving apparatus which disposes a hydrostatic transmission in an axle drive casing of a running vehicle, such as a tractor.

DESCRIPTION OF THE PRIOR ART

Generally, an engine of a running vehicle, such as a tractor, is disposed so that a crank shaft extends longitudinally of the vehicle body.

An HST housing axle driving apparatus of the conventional type is well known as disclosed in the U.S. Pat. Nos. 3,196,696 and 3,131,580, and the United Kingdom Pat. Nos. 2032586 and 924185.

A small-sized and lightweight engine, disposing vertically therein the crank shaft, has been provided at low manufacturing cost. However, an HST housing axle driving apparatus is reguired.

An axle driving apparatus for the vertical crank shaft type engine has been proposed by the applicant of the present invention and is disclosed in the Japanese Utility Model Laid-Open No. Sho 62-87253, the Japanese Utility Model Laid-Open No. Sho 62-85759 and the Japanese Patent Laid-Open No. Sho 61-261127.

In the above, the HST system transmission, in which a pump shaft and a motor shaft are vertically disposed in parallel to each other, is provided on the upper surface of an axle casing having a reduction gear, a differential gear and axles, the motor shaft being inserted into the axle casing and connecting with the reduction gear.

In this case, the HST system transmission is separate from the axle casing and is supported outside the casing, thereby increasing the size and gross weight of the vehicle.

In order for the motor shaft of a hydraulic motor, disposed vertically outside the casing to drive the horizontally disposed axles, a bevel gear unit must be interposed in both the driving systems.

SUMMARY OF THE INVENTION

In order to eliminate the inconvenience, discussed above the present invention has been designed. An object thereof is to provide an axle driving apparatus which disposes in the axle casing both a hydraulic motor and a hydraulic pump at the HST system transmission, and is usable for a small-sized running vehicle loading thereon a vertical crank shaft type engine.

Therefore, a pump shaft of the hydraulic pump is vertically disposed with respect to the vehicle axles, i.e. disposed perpendicular thereto. Furthermore, a motor shaft of the hydraulic motor is disposed in parallel to the axles so that oil passages between the hydraulic pump and the hydraulic motor are bent at right angles, whereby engine power is transmitted to the hydraulic motor, thereby changing the transmitting direction without using the conventional bevel gear unit.

The hydraulic motor and hydraulic pump are disposed collectively in one of the laterally divided half axle casings so that the oil passages are gathered in the one half axle casing only, thereby facilitating assembly of the axle driving apparatus.

In one embodiment the hydraulic motor disposed in one half axle casing is superposed on one of the axles, thereby allowing a more compact axle casing.

A center plate is interposed between the left and right half axle casings. The center plate serves also as a bearing support wall, an oil passage plate and a mounting member for the hydraulic motor, and therefore allows a holding member for a fixed swash plate of the hydraulic motor to be machined more easily.

The above and further objects and novel features of the invention will more fully appear from the following detailed description, when the same is read in connection with the accompanying drawings.

DESCRIPTION OF THE PREFERRED EMBODIMENT

Figure 1:
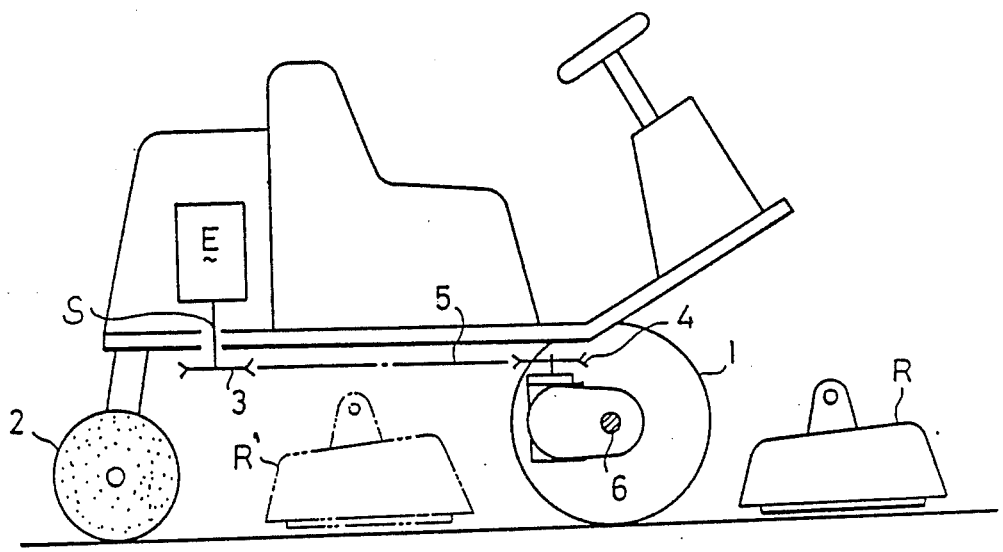
FIG. 1 is a perspective side view of a tractor equipped with an HST housing axle driving apparatus of the invention.

Referring to FIG. 1, a tractor equipped with a mower R is shown, which supports a vehicle body across front wheels or driving wheels 1, on axles 6 and rear wheels or steering wheels 2 and loads an engine E having a vertical crank shaft projecting therefrom.

An output pulley 3 is fixed to the vertical crank shaft S. A driving force is transmitted from the output pulley 3 to an input pulley 4, fixed to a pump shaft 9 (FIG. 3) of a hydraulic pump P, through a V-belt 5 which is stretched across the output pulley 3 and input pulley 4.

The pump shaft 9 of the hydraulic pump P is disposed in parallel to the vertical crank shaft at the engine E while axles (6) 6L and 6R of the tractor extend horizontally, i.e. pump shaft 9 is disposed perpendicularly to axles 6.

The mower R, as shown in FIG. 1, is usable as a front mower, or mountable as a mid mower R' at the center of the tractor (as shown in phantom).

In the present invention, the axle casing or housing which supports axles 6L and 6R so as to drive them while changing the speed of power of engine E, as shown in FIG. 1, is flat and horizontally disposed.

The axle casing is laterally divided into substantially two with respect to the axles. One left-side or first half axle casing 12 comprises an axle support for supporting the first axle 6L and an HST system transmission casing which is integral with the axles support.

The other right-side or second half axle casing 11 houses therein a second axle support for supporting the second axle 6R, a reduction transmission and a differential gear unit.

A vertical bearing wall 11a is provided at the junction between the right-side half axle casing 11 and the left-side half axle casing 12. A bearing for a speed reduction shaft 18 and a holder for a fixed swash plate 16, at the hydraulic motor M, are provided at the bearing wall 11a.

Figure 3:
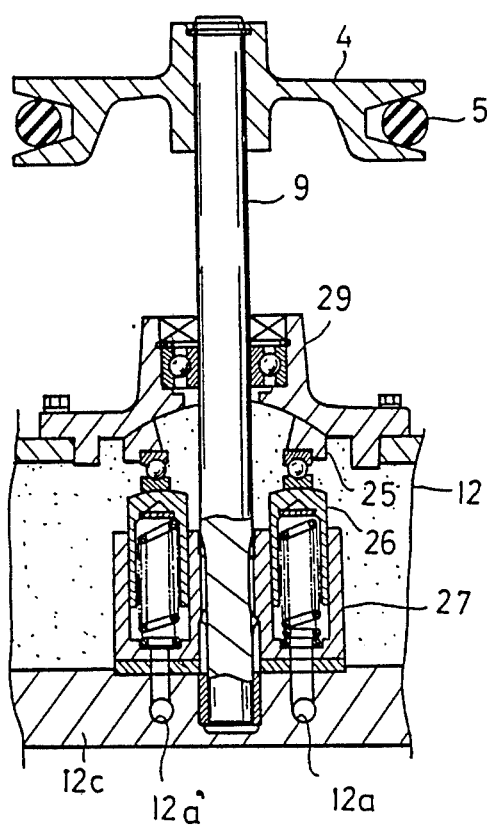
FIG. 3 is a sectional view of a portion of FIG. 2, including a hydraulic pump.

The hydraulic pump P is vertically fixed on a bottom wall 12c at the left-side half axle casing 12 (FIG. 3). Hydraulic motor M is attached to the inner surface of a side wall 12e of the left-side half axle casing 12 and is disposed in parallel to the axles 6L and 6R.

Pressure oil is supplied from the hydraulic pump P to the hydraulic motor M through an oil passage 12a, formed in the bottom wall 12c, and 12b, formed in the side wall 12e.

The pressure oil is returned from the hydraulic motor M to the hydraulic pump P through oil passages 12b' and 12a'.

The pump shaft 9 of the hydraulic pump P extends vertically and projects from the upper surface of the left-side half axle casing 12 and fixedly supports at the upper end the input pulley 4. Pump shaft 9 is diposed perpendicular to axles 6L and 6R.

A motor shaft 24 of the hydraulic motor M is rotatably supported at one end to the side wall 12e, and at the other end perforates or extends through the vertical bearing wall 11a and enters the right-side half axle casing 11 where it is rotatably supported by a hearing lid 30 of the casing 11 shaft 24 fixedly supports, at an intermediate portion, a small diameter gear 3. Motor shaft 24 is disposed in paralled to axles 6L and 6R.

The speed reduction transmission including shaft 18 is mounted across the vertical bearing wall 11a and bearing lid 30. A large diameter gear 14 and a small diameter gear 15 are fixed to shaft 18.

The small diameter or motor gear 13 engages with the large diameter gear 14. The smaller diameter gear 15 engages with a ring gear 7 of the differential gear unit.

The left-side half axle casing 12 is open upwardly and is closed by a lid 29 (FIG. 5) through which the vertical pump shaft 9 extends outwardly. Hence, driving force is transmitted from the pump shaft 9 so as to drive the hydraulic pump P.

A swash plate rotating shaft 8 laterally projects from the left-side half axle casing 12 and connects with a speed change lever (not shown) at the tractor through a linkage mechanism (not shown), thereby rotating a swash plate 25 in the hydraulic pump P (FIG. 3).

The pressure oil, discharged by rotations of a rotor 27 (FIG. 3) and piston 26 of the hydraulic pump P, is guided into cylinders formed in rotor 22 of the hydraulic motor M through the oil passages or means for transferring oil 12a and 12b formed at the bottom wall 12c and side wall 12e at the left-side half axle casing 12, thereby driving the hydraulic motor M.

The pressure oil, after driving the hydraulic motor M, is returned to the hydraulic pump P.

The rotations of the piston 23 and rotor 22 at the hydraulic motor M are transitted to the motor shaft 24 and then from the small diatmeter gear 13, fixed at the motor shaft 24, to the large diameter gear 14, on the speed reduction shaft 18.

The differential gear unit has no gear casing. A pinion shaft 17 is fixed at the inner periphery of ring gear 7. Pinion shaft 17 has at its center a bore through which the axles 6L and 6R are insertd and abut at their inner ends thereof against each other and are pivotally supported.

Pinions 19 and 20, freely fitted onto the pinion shaft 17, engage with differential side gears 21L and 21R, which are fitted through splines onto axles 6L and 6R.

Next, referring to FIG. 3, the oil passage 12a and 12a' at the bottom wall 12c and 12b and 12b', at the side walls 12e are arranged perpendicularly to each other in the oil transporting direction.

The hydraulic pump P supports in spline a rotor 27 driven by the pump shaft 9; pistons 26 are fitted movably in reciprocation in open cylinder bores of the rotor 27 and are spaced by regular intervals. Pistons 26 are biased at the head thereof, always toward the swash plate 25 by springs interposed between the pistons 26 and the rotor 27 respectively.

When the rotor 27 is driven by the rotation of pump shaft 9, the utmost end of each piston 26 revolves while abutting against the swash plate 25 which is angularly changed to a desired position by the swash plate rotating shaft 8, whereby the pistons 26 repeat reciprocation to perform pumping to meet with an angle of the swash plate 25 to thereby discharge the pressure oil.

The pressure oil passes through the oil passages 12a and 12b at the bottom wall 12c and side wall 12e and is fed into the cylinders open in the rotor 22 of the hydraulic motor M, thereby projecting the pistons 23 movable in reciprocation.

At the hydraulic motor M, a fixed swash plate 16 is fixed to the vertical bearing wall 11a at the right-side half axle casing 11, the fixed swash plate 16 always abuts against the head of each piston 23.

When the pistons 23 are brought into press-contact with the slanted surface of the fixed swash plate 16 by oil pressure, the rotor 22 generates a torque.

When each piston 23 moves along the fixed swash plate 16 to enter the rotor 22, the pressure oil in the cylinder is discharged therefrom to be returned to an inlet of the hydraulic pump P through the oil passages 12b' and 12a'.

Figure 4:
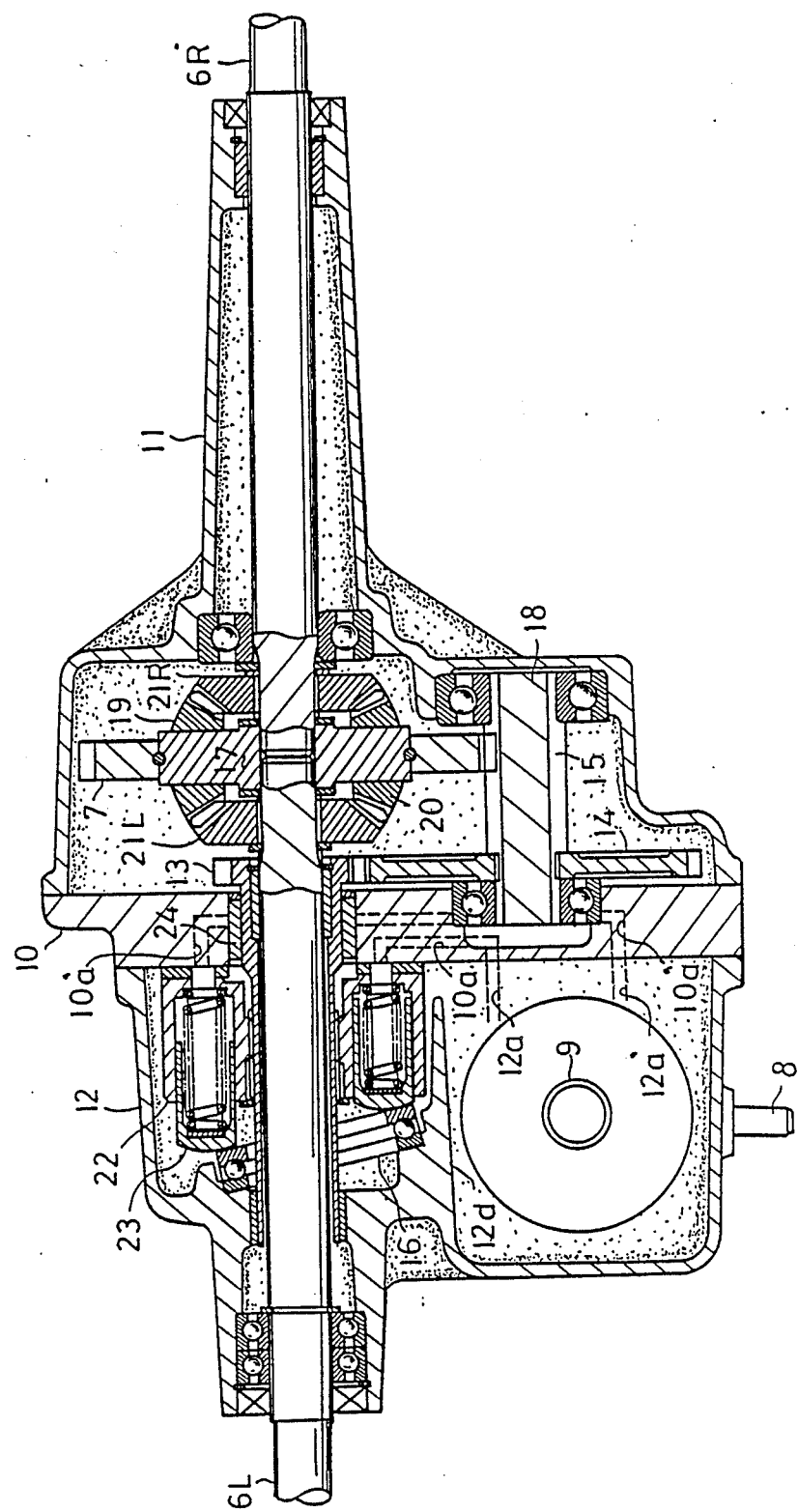
FIG. 4 is a sectional plan view of a modified embodiment of the present invention, in which a hydraulic motor is superposed on an axle, and an axle supporting oil passage plate is interposed between right and left axle casing.

Next, explanation will be given of a modified embodiment of the invention shown in FIG. 4, in which a hydraulic motor M is not disposed in the left-side half axle casing 12, but superposed on the axle 6L.

The hydraulic motor M, however, does not directly rotate the axle 6L, but disposes the axle 6L and motor shaft 24 merely in the freely fitting state.

In other words, the motor shaft 24 is made hollow and freely fitted on the outer periphery of axle 6L.

The hollow motor shaft 24 perforates a center plate 10 and projects into the right-side half axle casing 11 and fixedly supports small diameter or motor gear 13 adjacent to the differential gear unit.

A holder 12d for a fixed swash plate 16 at the hydraulic motor M is provided at an inner wall of the left-side half axle casing 12 and extends around the axle 6L.

The small diameter gear 13 engages with a speed reduction transmission including a large diameter gear 14 supported on a speed reduction shaft 18 and disposed along the center plate 10. Another small diameter gear 15 on the shaft 18 engages with a ring gear 7 of the differential gear unit.

Figure 2:
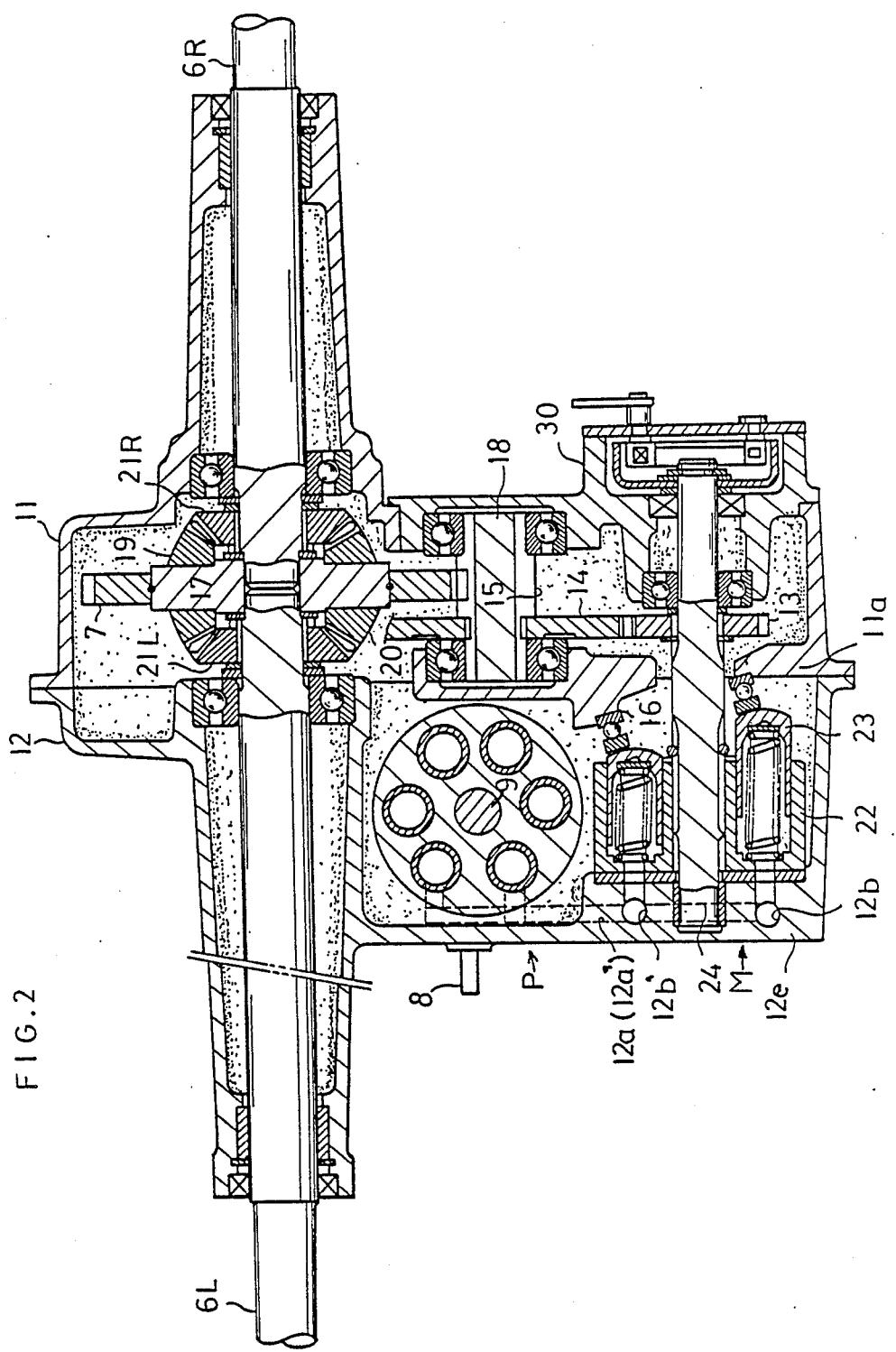
FIG. 2 is a sectional plan view of one embodiment of the HST housing axle driving apparatus of the invention.

In this construction, a hydraulic pump P is mounted on a bottom wall 12c of the left-side half axle casing 12 as the same in FIGS. 2 and 3.

Pressure oil is fed from the hydraulic pump P to the hydraulic motor M through an oil passage 12a provided at the bottom wall 12c of the left-side half axle casing 12 and an oil passage 10a in the center plate 10.

Return oil from the hydraulic motor M is returned to the hydraulic pump P through an oil passage 10a' of the center plate 10, and an oil passage 12a' in thee bottom wall 12c of the casing 12.

The center plate 10 is provided with the oil passages 10a and 10a' and also serves as a bearing portion for the axle 6L, hollow motor shaft 24 and speed-reduction shaft 18.

Figure 5:
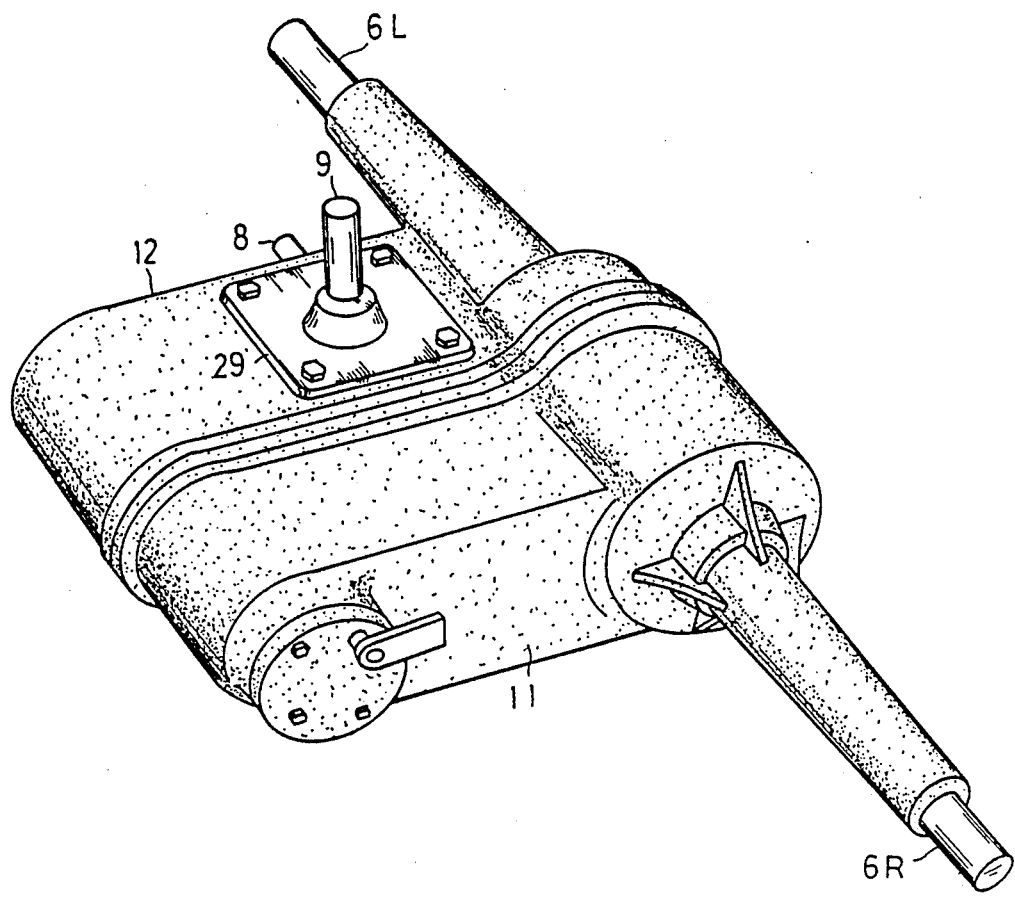
FIG. 5 is a perspective view of the HST housing axle driving apparatus shown in FIG. 2.

FIG. 5 is a perspective view of the entire HST housing axle driving apparatus.

The HST housing axle driving apparatus constructed as above-mentioned includes the following advantages:

Since the hydraulic pump P and hydraulic motor M are housed in the axle casing, the HST casing is eliminated to make compact the axle driving apparatus.

Although conventionally the direction of transmitting the power is changed by use of the bevel gear, the present invention disposes the pump shaft 9 of the hydraulic pump P, housed in the left-side half axle casing 12 perpendicularly to the bottom wall 12c at the casing 12 and the hydraulic motor M is disposed in parallel to the axles 6L and 6R, whereby there is no need of providing the bevel gear as would be conventional. Instead, the oil passage 12a, 12b, 12a' and 12b' are bent at right angles to be substituted for the bevel gear.

Since the hydraulic pump P and hydraulic motor M are mounted to the bottom wall 12c and side wall 12e of the casing 12, both the pump P and motor M can be connected with each other through the oil passages 12a, 12a', 12b and 12b', whereby there is no need of providing an oil passage at the casing 11.

The hollow motor shaft 24 is sleeved onto the axle 6L and the hydraulic motor is provided around the motor shaft 24, whereby the left-side half axle casing is swollen slightly around the axle 6L only enabling the hydraulic motor M to be housed therein, thereby making compact the left-side half axle casing 12.

The smaller diameter gear 13 can be housed in a swollen portion at the right-side casing 11 for containing the differential gear unit as aforesaid, there is no need of forming a swollen portion used for the smaller diameter gear 13 only, thereby enabling the right-side casing 11 to be made compact.

Furthermore, when the speed reduction transmission associating the motor shaft with the differential gear unit is the reduction gear as in the present embodiment, since the smaller diameter gear 13 on the motor shaft 24 is adjacent to the differential gear unit, the larger diameter gear 14 can be made larger in diameter without any hindrance. Meanwhile, the smaller gear 13 can be smaller in diameter corresponding to the above. Hence, a reduction ratio is desirably selectable without especaially enlarging the axle casings.

The axle casing is divided into the left-side half axle casing 12 and right-side axle casing 11, the center plate is interposed therebetween, and the hydraulic motor M is provided in the left-side casing 12, whereby the oil passages connecting both the motor M and pump P can be formed in the center plate 10 and the center plate 10 can also serve as the bearing for the axle 6L. Hence, the axle driving apparatus of the invention is simple to assemble.

Furthermore, the support 12d for the swash plate 16, which is provided at the inner side surface of the left-side half axle casing 12, can be integral with the casing 12 when molded, thereby being easy to machine.

While a preferred embodiment of the invention has been described using specific terms, such description is for illustrative purpose only, and it is to be understood that changes and variations may be made without departing from the spirit or scope of the following claims.

What is claimed is:

1. An axle driving apparatus comprising:
   an axle housing, said axle housing being divided into a first axle casing and a second axle casing;
   a differential gear unit disposed within said axle housing;
   a first axle disposed within said first axle casing;
   a second axle disposed within said second axle casing;
   a hydraulic pump disposed within said axle housing, said hydraulic pump having a pump shaft which is disposed perpendicular to said first and second axles;
   a hydraulic motor disposed within said axle housing, said hydraulic motor having a motor shaft which is disposed in parallel to said first and second axles;
   a motor gear fixed to said motor shaft;
   a speed reduction transmission for drivingly connecting said motor gear and said differential gear unit;
   said speed reduction transmission and said differential gear unit being disposed within said second axle casing;
   said hydraulic pump and said hydraulic motor being disposed within said first axle casing;
   said hydraulic pump being disposed on a bottom wall of said first axle casing between said first axle and said hydraulic motor;
   said hydraulic motor being disposed at an inner side wall of said first axle casing; and
   means for transferring oil between said hydraulic pump and said hydraulic motor.

2. An axle driving apparatus, as set forth in claim 1, wherein said means for transferring oil comprises passages formed in said axle housing.

* * * * *